(No Model.)

J. A. HEMSTEGER.
SPOON HOLDER FOR COOKING VESSELS.

No. 269,054. Patented Dec. 12, 1882.

*fig 2,*

WITNESSES:

INVENTOR:
J. A. Hemsteger
BY Munn & Co
ATTORNEYS.

UNITED STATES PATENT OFFICE.

JOHN A. HEMSTEGER, OF PIQUA, OHIO.

SPOON-HOLDER FOR COOKING-VESSELS.

SPECIFICATION forming part of Letters Patent No. 269,054, dated December 12, 1882.

Application filed September 20, 1882. (No model.)

*To all whom it may concern:*

Be it known that I, JOHN A. HEMSTEGER, of Piqua, in the county of Miami and State of Ohio, have invented a new and Improved Spoon-Holder for Cooking-Vessels, of which the following is a full, clear, and exact description.

My invention consists in the combination, with a pan, sauce-pan, or other vessel used in cooking operations, of a device for holding or retaining a spoon, the object being to save the trouble and annoyance caused by the spoon slipping into the vessel, which usually occurs if the spoon is left free.

The device may be a permanent or a removable attachment, or may be formed in the rim of the vessel, as set forth hereinafter.

Reference is to be had to the accompanying drawings, forming a part of this specification, in which similar letters of reference indicate corresponding parts in both the figures.

Figure 1:
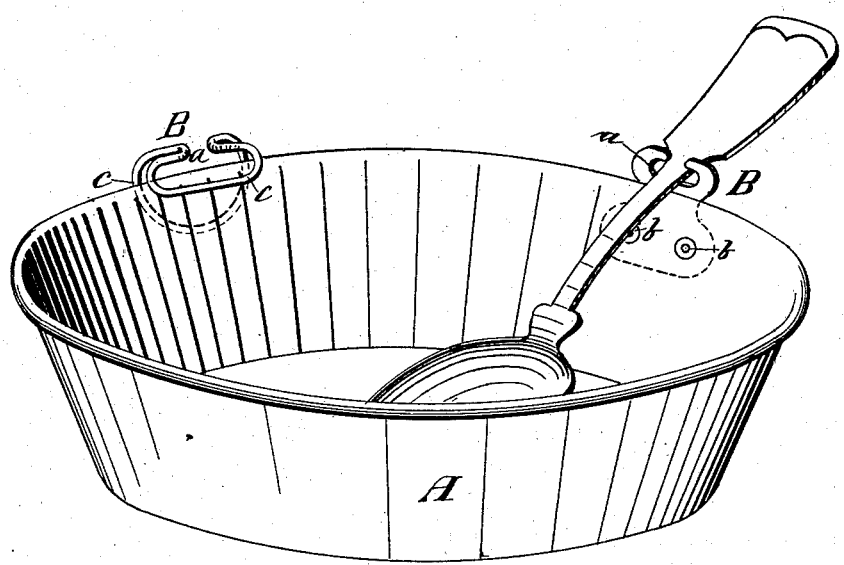
Figure 1:
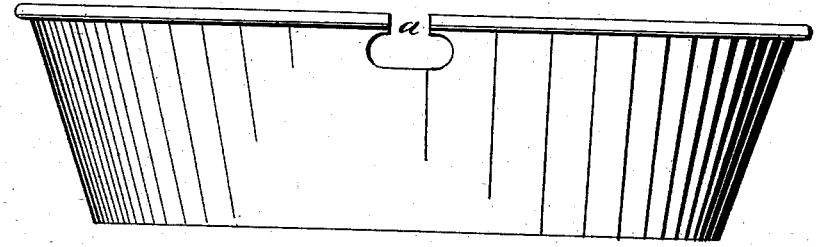

Figure 1 is a perspective view of a pan provided with the spoon-holding attachment, and Fig. 2 shows the invention as formed out of the rim of the pan.

The pan or vessel A may be of any usual character.

B is the spoon-holder, attached to the rim of the pan and formed with a slot, $a$, of a size which allows ready insertion of the smaller part of the spoon-handle. In one case the holder is shown as permanently attached to the rim by rivets $b\ b$, with the slotted portion projecting above the edge of the pan. In the other case the holder is formed with spring-fingers $c\ c$ for grasping the rim and retaining the holder thereon, at the same time allowing its removal when not required for use. When made as an attachment the holder may be formed of sheet metal or of wire. In Fig. 2 the slot $a$ is formed in the rim of the pan.

In use, the spoon is placed, as shown, with the smaller portion in the slot, and by the shoulders of the enlarged end of the handle the spoon is prevented from slipping down into the pan. The spoon is thus retained in convenient position for being taken up when wanted, and the necessity of removing it from the pan to avoid its slipping in is thus avoided.

This device is especially useful in the operations of mixing materials, and in boiling or stewing fruits, liquors, &c. It also saves the soiling of floor, stove, and table, which invariably follows removal of the spoon from the vessel, and the burning of fruits and jellies, especially, can often be avoided by having the spoon at hand.

Having thus described my invention, I claim as new and desire to secure by Letters Patent—

The described cooking-vessel A, constructed in its side, near the upper edge, with the slot $a$, adapted to receive and retain a spoon as against slipping down into the pan when released from the hand, as shown and described.

JOHN A. HEMSTEGER.

Witnesses:
   Mrs. IDA M. HEMSTEGER,
   J. BOUI HEMSTEGER.